United States Patent [19]

Suggs et al.

[11] Patent Number: 5,609,708
[45] Date of Patent: Mar. 11, 1997

[54] METHOD OF MAKING A SEAL FOR SHAFTS AND VALVE STEMS

[76] Inventors: Steven M. Suggs, 201 Cedarwood Dr.; Reid M. Meyer, 916 Northwood Cir., both of Nacogdoches, Tex. 75961

[21] Appl. No.: 569,948

[22] Filed: Dec. 11, 1995

Related U.S. Application Data

[62] Division of Ser. No. 85,550, Jun. 30, 1993, Pat. No. 5,499,827.

[51] Int. Cl.$^6$ ........................................ F16J 15/00
[52] U.S. Cl. .................. 156/166; 264/280; 277/229; 427/189; 427/194
[58] Field of Search ...................... 277/227, 229, 277/230, DIG. 6; 264/280; 427/365, 189, 194; 156/166

[56] References Cited

U.S. PATENT DOCUMENTS

| | | |
|---|---|---|
| 1,020,115 | 3/1912 | Price . |
| 1,501,541 | 7/1924 | Hall . |
| 2,134,671 | 10/1938 | Payne ................................. 277/230 |
| 2,404,952 | 7/1948 | Fiechter ............................... 277/227 |
| 2,666,005 | 1/1954 | Norehad . |
| 3,404,061 | 4/1963 | Shane et al. . |
| 3,534,652 | 10/1970 | Zumeta . |
| 3,646,846 | 3/1972 | Houghton . |
| 3,894,742 | 7/1975 | Trelease . |
| 4,086,067 | 4/1978 | Busch et al. . |
| 4,298,207 | 11/1981 | Hopper et al. . |
| 4,642,201 | 2/1987 | Vogel . |
| 4,667,969 | 5/1987 | Suggs, III . |
| 5,301,960 | 4/1994 | Meyer et al. . |

FOREIGN PATENT DOCUMENTS

| | | |
|---|---|---|
| 3309341 | 6/1984 | Germany . |
| 50-39217 | 12/1975 | Japan . |
| 55-69360 | 5/1980 | Japan . |
| 454649 | 7/1935 | United Kingdom . |

OTHER PUBLICATIONS

Grafoil Engineering Design Manual, Union Carbide Corp., 1987. pp. 3,4,7,9,10,14 Author Unavailable.
Calgraph Technical Manual, Polycarbon, Inc., Jul. 1, 1993 pp. 3.1, 3.2, 4.1, 4.2, 25.1, 25.2, 25.4, 25.5, Author Unavailable.

*Primary Examiner*—Jeff H. Aftergut
*Attorney, Agent, or Firm*—Kennedy & Kennedy

[57] ABSTRACT

A packing material having a resilient core and a uniform non-seamed exterior surface comprising a plurality of discrete compressible particles attached to the flexible core and to each other, the particles being compressed after attachment. The method comprises surrounding the flexible elongate core with a plurality of powder-like particles which together feed through a plurality of aligned pairs of feed groove rollers. The core, with the attached particles, wraps under tension around an arcuate sector of a cylinder or wheel passing between a pair of spaced-apart walls. A roller pushes against the core to compress the powder particles together and to bias the length of packing material into a spiral coil.

8 Claims, 2 Drawing Sheets

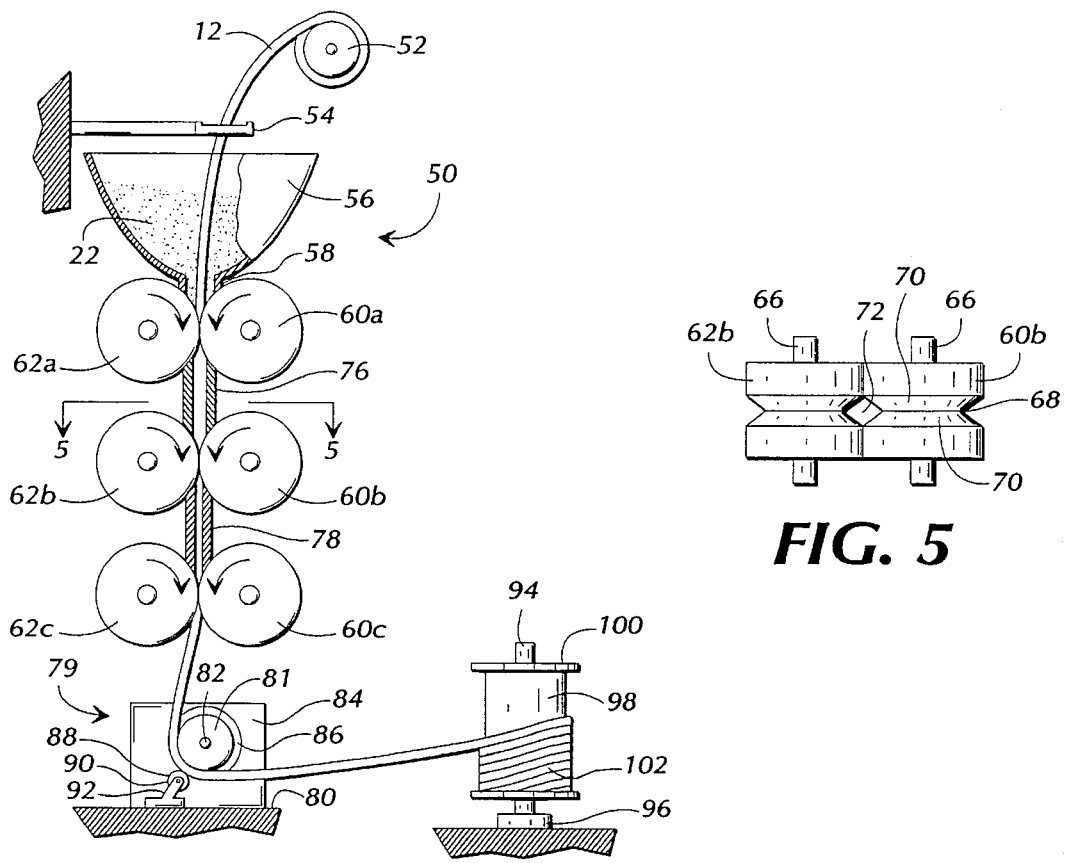
FIG. 4
FIG. 5
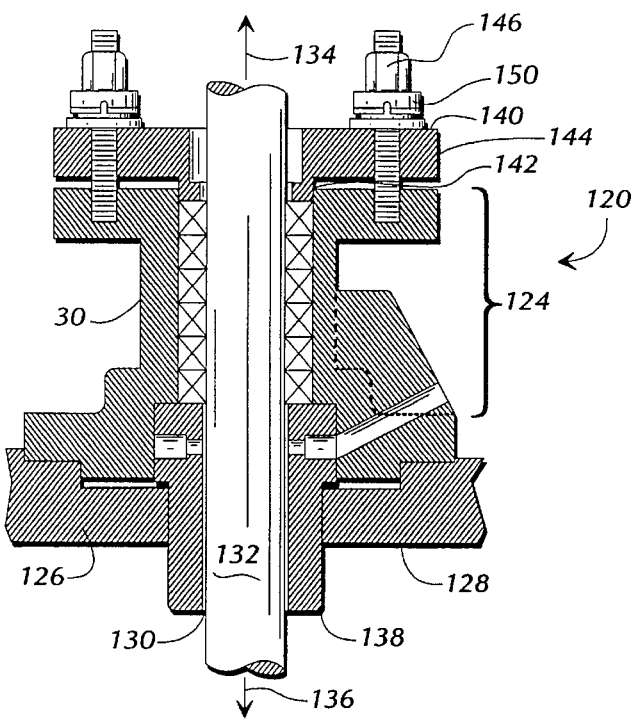
FIG. 6

METHOD OF MAKING A SEAL FOR SHAFTS AND VALVE STEMS

This is a division, of application Ser. No. 08/085,550 filed Jun. 30, 1993, now U.S. Pat. No. 5,499,827.

TECHNICAL FIELD

The present invention relates to seals for rotary or reciprocating shafts and valve stems. More particularly, the present invention relates to a seal having a uniform seamless exterior surface for stuffing box service.

BACKGROUND OF THE INVENTION

Fluid flow control equipment, such as pumps, compressors, agitators, and valves are widely used in industries such as utilities, refineries, chemical and petrochemical. These equipment generally serve a fluid flow control function, and each typically includes a rotary or reciprocating shaft. The shaft can be motor driven or manually operated. The shaft rotates in order to control fluid flow through the equipment. For example, the shaft of a rotary pump operatively connects to a motor on the exterior of a pump casing to an impeller or blade on the interior. The motor rotates the shaft, which in turn rotates the impeller. In a valve, the shaft connects to a gate on the interior of the casing for controlling flow of fluid through the valve. Thus, there are at least three openings in the pump (or valve) casing: a first fluid opening for an inlet pipe, and second fluid opening for an outlet pipe and an opening for the shaft.

The two fluid openings for the inlet and outlet pipes are sealed conventionally. The shaft however passes through a recessed area within the pump (or valve) known as the "stuffing box". The term stuffing box is derived from the method employed to prevent fluid from leaking through this opening in the casing for the shaft. The fluid is contained within the pump by stuffing or packing a material around the shaft to seal the opening. The packing material in the stuffing box thus functions to protect the fluid flow equipment against leakage where the rotating or reciprocating shaft or valve stem extends through the casing.

For a number of reasons, rotating and reciprocating shafts are difficult to seal. In operation, the shaft is capable of both radial and axial displacement. Radial displacement typically results from manufacturing inaccuracies or could result from wear caused by metal-based packings rubbing against the shaft during operation. Axial displacement results from different thermal expansions produced through normal operation of the shaft. In addition, conditions in the stuffing box are constantly changing. For example, shaft speeds may vary. The packing may be required to withstand high temperatures and pressures followed by low temperatures and pressures. The surfaces of the shaft in the stuffing box are often pitted and rough, causing excessive and uneven wear of the packing material. Friction between the shaft and the packing produces heat. Excessive heat can cause packing to harden and loose resiliency thereby creating spaces and gaps where leakage can occur. Further, environmental concerns have lead to increased awareness of emissions of volatile fluids from pumps and valves. Government regulatory agencies and government legislation have mandated reduced emissions from pumps and valves used in industry. In particular, the petrochemical industry faces significant reductions in allowable emissions. The 1990 Clean Air Act has mandated reductions in fusitive emissions as part of the efforts to improve air quality. Fugitive emissions are fumes and gases that escape to the atmosphere from valves, pumps and pipes in processing plants such as refineries. The reduced levels are called "zero emission" because the permitted levels are 500 parts per million and less, depending on the severity of the ambient air quality. The trend is towards further reductions of permissible levels of emissions, even to 10 or fewer parts per million. Many industrial plants must install improved packing to meet the air quality requirements that fugitive emissions be reduced significantly.

Various types of packing for a stuffing box are noted in the prior art. These packings include soft packing, metallic packing and graphite packing. Soft packing generally is made from fabric, hemp, or rubber fibers woven into strands and formed into a braided length. Metallic packing incorporates flexible metallic strands or foils in a soft packing core. Metallic packing has several advantages over soft packing. These advantages include improved maintenance for the fluid flow equipment. Metallic packing is easier to pick and remove from the stuffing box as a unified piece than is soft packing. Further, the metallic packing provides resiliency for conforming the packing to the shaft. Expanded graphite in the form of a solid annulus or ring also provides a seal for a stuffing box. Graphite provides a seal with high temperature, high pressure capability.

Recent developments in packing materials have been made in response to the increased environmental concerns, discussed above. One packing provides a resilient flexible core of longitudinally braided yarns having an exterior graphite skin. This skin is spirally wound in an overlapping manner about the core. Such spirally wound packing, however, was not satisfactory as the overlapping edges provided leak paths through the packing for fluids. In addition, the spirally wrapped packing material could not be satisfactorily formed into a spiral coil for bulk distribution. Instead, this packing was supplied as a preformed ring having an inner diameter and an outer diameter sized to fit a particular stuffing box. Soft packing typically was provided in bulk form as a spiral coil. The appropriate length of packing was cut from a coil of packing having the cross-section width for the particular fluid flow equipment. Maintenance inventories therefore held coils of packing in the relatively few standard cross-sectional widths. Inventories of pre-formed rings however were quite large, as there are no standard sizes of inner and outer diameters for valves and pumps. For example, a five-inch valve made by one manufacturer may have a two-inch stem in a three inch diameter stuffing box. A five-inch valve made by another manufacturer may have a three inch stem in a four inch stuffing box. Each requires a one half inch cross-sectional packing, but the ring diameters are different.

Another known packing provides a flexible core of longitudinally braided yarns with a graphite skin of expanded graphite foil wrapped longitudinally about the core. While this packing has met with satisfactory results in many sealing situations, and especially for petrochemical sealing to meet the reduced emission requirements, the packing has drawbacks discussed below.

This packing is manufactured by dipping a length of fiber mesh into a mixture of graphite powder, binder and solvent. The mixture dries resulting in a flexible core possessing the beneficial maintenance features of the wire mesh core and the graphite lubrication for high temperature, high pressure sealing. The core is then longitudinally wrapped with a skin element made of expanded graphite having a layer of adhesive. The resulting sealing material is passed through a coiling device that densifies the material to the desired degree as well as spiralling the packing into a coil for bulk handling.

While the packing has met a need in the industry and has successfully sealed valves under extreme conditions, this packing has several drawbacks. The packing can only be manufactured by hand in relatively short lengths, typically of about ten feet or less. A sheet of expanded graphite is hand wrapped longitudinally around the flexible core to form the skin sheet. The sheet entraps air as it is folded around the core. The density of the packing material thereby varies. Hand wrapping of the graphite skin also is time consuming. Hand wrapping also lacks uniformity of the wrap around the core. While the packing does not have the plurality of seams, such as found in the spiral wrapped packing, the single seam still provides an opportunity for gaps to form in the seal in the stuffing box. It is typically recommended that the seam be positioned against the wall of the stuffing box instead of against the shaft. Further, the adhesive can contribute about 20% of the packing by weight. The adhesive increases the bulk of the packing and limits the temperature and pressure at which the packing can be used. Adhesive exuded from the packing under pressure can cause the shaft to freeze by adhering the shaft to the packing and the stuffing box.

Accordingly, there is a need in the art for a packing material having a resilient core and a uniform non-seamed surface, and a method of manufacturing such packing.

SUMMARY OF THE INVENTION

The present invention solves the above-described problems in the prior art by providing a packing material having a resilient core and a uniform non-seamed exterior surface. The present invention further provides a method of manufacturing continuous lengths of packing material having a resilient core and a uniform non-seamed exterior surface.

Briefly described, a seal in accordance with the present invention comprises a flexible core made of interwoven fibers and a binder material. A seamless skin element comprises a plurality of discrete compressible particles attached to the flexible core and to each other, the particles being compressed after attachment. The preferred form of the packing material is an elongate strand that is spiralled; the packing material may comprise a die-molded ring. The binder material in the core preferably comprises solidified graphite. The discrete compressible particles are preferably expanded intercalated flake graphite.

The present invention further provides a method of manufacturing a seal material comprising a flexible core and binder, which is covered by seamless skin element. The seamless skin element comprises a plurality of discrete particles attached to the flexible core and to each other and compressed in place. Briefly described, the method comprises surrounding the flexible elongate core made of a tubular lattice of interwoven fibers and the binder material with a plurality of powder-like particles. The core and the particles feed through a plurality of aligned pairs of V-grooved rollers. The V-grooved rollers are arranged sequentially such that the openings defined by the V-grooves decrease in cross-section from one pair of rollers to the next. The particles adhere to the core and to each other. The core wraps under tension around an arcuate sector of a cylinder, passing between a pair of spaced-apart walls that extend radially outwardly from the cylinder. A roller pushes against the core on the arcuate sector to compress the powder particles together and to bias the length of packing material into a spiral coil.

More particularly described, the method of making the seamless packing material for use in forming a seal initially applies a film of adhesive to an exterior surface of the core. The film of adhesive receives a first layer of the particles that surround the core as the core and particles feed through the plurality of aligned pairs of V-groove rollers. The packing material feeding from the cylinder is preferably wrapped onto a spool that rotates on a mandrel, in order to form a coiled length of packing material.

Accordingly, it is an object of the present invention to improve packing material for sealing a rotary or reciprocating shaft or valve stem.

It is another object of the present invention to improve the method of manufacturing a seal for a stuffing box.

It is another object of the present invention to increase the uniformity of density in a packing material.

It is another object of the present invention to reduce the variability of density in a packing material.

It is another object of the present invention to reduce the percentage weight of adhesive in a packing material.

These and other objects, features, and advantages of the present invention will become apparent from a reading of the following specification, in conjunction with the drawings and appended claims.

BRIEF DESCRIPTION OF THE DRAWINGS

FIG. 4 is a front plan view of an apparatus for manufacturing the packing material illustrated in FIG. 1.

FIG. 5 is a cross-sectional view taken along line 5—5 of FIG. 4, illustrating the V-groove rollers in the manufacturing apparatus of FIG. 4.

FIG. 6 is a cross-sectional view of a pump, including a stuffing box, illustrating the use of the seal illustrated in FIG. 3.

DETAILED DESCRIPTION

Figure 1:
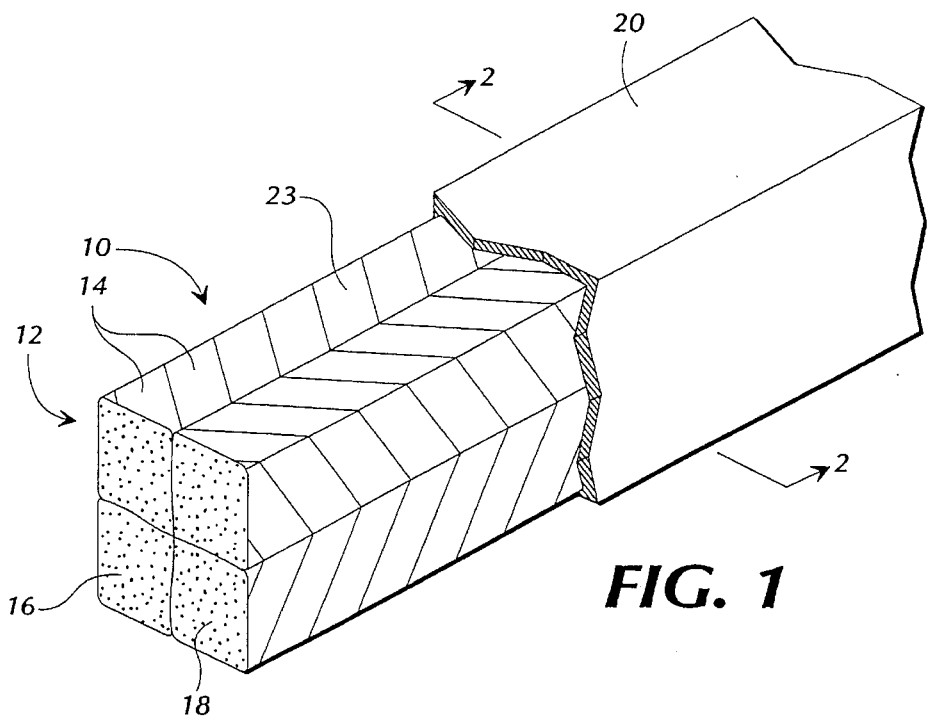
FIG. 1 is a perspective view of a preferred embodiment of a packing material of the present invention.

Referring now in more detail to the drawings, in which like numerals indicate like parts throughout the several views, FIG. 1 shows a perspective view of a preferred embodiment of the present invention generally at 10. It is to be understood that the present invention comprises a seal and is referred to herein as either a seal or a packing material. The packing 10 comprises an elongate flexible core 12 made of a plurality of interwoven yarns 14. Each of the yarns 14 comprises a plurality of braided fibers 16. In an embodiment having a wire mesh core 12, a binder material 18 preferably is received within the interstices of the wire mesh. The binder material 18 preferably comprises solidified graphite. The binder material is introduced into the flexible core 12 by dipping the mesh core in a mixture of graphite powder, binder, and a solvent. Other binders or powders can be used to fill the interstices of the braided core 12. Cores made of synthetic yarns typically do not require a binder material. The flexible core can be manufactured of a number of materials, including fabric yarns, rubber, PVC, paper and wire. The flexible core in alternate embodiments can be a hose, sleeving, pipe, and the like. It is preferred that the core 12 be flexible and resilient for use as a seal. A preferred embodiment uses a fiberglass or carbon core.

A skin element 20 encloses the flexible core 12. The skin element 20 comprises a plurality of discrete particles 22 having a powder-like consistency. The particles 22 attach to the flexible core 12 and to each other during manufacturing of the packing material 10. In a preferred embodiment, the core 12 includes a thin layer of an adhesive 23 for receiving the particles 22. The particles 22 are compressed against each other and the core 12 to form the uniform skin 20 having no seams. The particles 22 fill the interstices of the yarns 14 on the exterior surface. The resulting skin 20 resists penetration by fluids into the core 12. The skin 20 preferably has a thickness of between about 1 and 10 mil. In a preferred embodiment of the packing material 10 has a skin 20 having a thickness of about 5 mil. In a preferred embodiment, the powdered particles are intercalated graphite.

Figure 2:
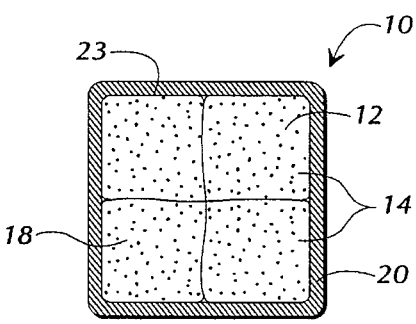
FIG. 2 is an end view of the packing material shown in FIG. 1.

FIG. 2 illustrates a cross-sectional view of the assembled packing 10 taken along lines 2—2 of FIG. 1. The packing 10 comprises the braided core 12 with the skin 20 forming a substantially impermeable seamless barrier around the core. As discussed below, the skin 20 is attached to the core 12 by affixing a plurality of powder particles 22 to the core and to adjacent particles. The particles 22 are then compressed together to form the uniform, seamless skin 20. The plurality of the particles 22 fill in the gaps and crevices in the exterior surface of the core 12.

Figure 3:
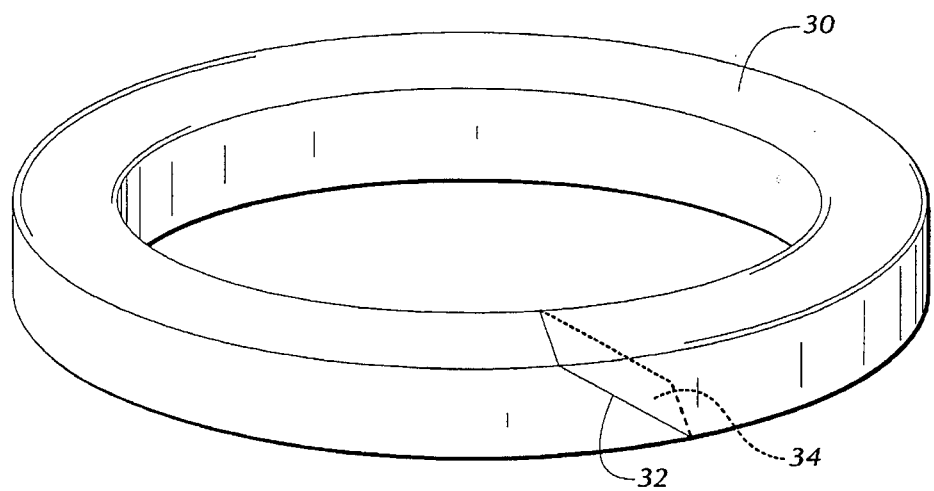
FIG. 3 is a perspective view of a seal made with the packing material illustrated in FIG. 1.

FIG. 3 illustrates in perspective view a ring-like seal 30 formed by cutting a selected length of the packing material 10. The cut length of packing material 10 is then encircled to form the packing ring 30. It is preferred that the ring lines 32 extend diagonally across one pair of opposed faces 34 (shown hidden line) of the assembled packing 10 to obtain the mating engagement of the ends of the ring seal 30. As discussed below, the ring seal 30 is used to seal the stuffing box of pumps, valves, and the like having rotary or reciprocating shafts.

FIG. 4 is a front plan view of an apparatus 50 for manufacturing the packing material 10 of the present invention. A spool 52 holds an elongate length of the core 12. The core 12 passes through a sprayer 54 held above a funnel-like hopper 56. The sprayer 54 connects to a supply of adhesive (not illustrated). The hopper 56 receives and holds a supply of the powdered particles 22. The hopper 56 has an open bottom end 58 mounted above a sequential plurality of paired calendar rollers 60 and 62.

The calendar rollers 60 and 62 are best illustrated in FIG. 5, which is a top view taken along lines 5—5 of FIG. 4. The calendar rollers 60 and 62 rotate in opposite directions as indicated by the arrows 64 and 65. The calendaring rollers 60 and 62 each mount on respective drive shafts 66. The drive shafts 66 of each roller operatively connects to the same variable speed drive motor (not illustrated). This assures that the calendaring rollers 60 and 62 rotate at uniform speeds for guiding the flexible core 12 between the pair of rollers. The calendaring rollers 60 and 62 each have a central V-groove 68 defined by inwardly tapering faces 70. The rollers 60 and 62 are positioned adjacent each other so that the rollers just contact each other. The V-grooves in the pair of rollers defines a central opening 72 through which the flexible core 12 passes. The illustrated embodiment uses three pairs of the calendaring rollers 60 and 62. The opening 72 decreases in cross-sectional width in sequence from one set of the rollers 60 and 62 to the next set of rollers.

Returning now to FIG. 4, a tube member 76 extends between a lower side of the pair of rollers 60a and 62a and an upper side of the second pair of rollers 60b and 62b. Similarly, a second tube 78 extends between the lower side of the second pair of rollers 60b and 62b and the upper side of the third pair of rollers 60c and 62c. The second tube 78 is preferably narrower than the first tube 76. The tubes 76 and 78 receive and hold particles 22 against the core 12 passing through the tubes.

A compressor 79 mounts to a frame 80 adjacent the last pair of roller 60c and 62c. The compressor 79 includes a wheel 81 rotatably mounted to a pin 82 that connects between a pair of flanges 84 (one flange 84 is removed for illustration purposes). The wheel 81 includes a pair of spaced apart walls 86 that extend radially from the wheel. A roller 88 rotatably mounts on a pin 90 that attaches to a mounting bracket 92. The width of the roller 88 is sized to fit in a gap between the pair of walls 86.

A mandrel 94 mounts near the wheel 80. In the illustrated embodiment, the mandrel 94 is vertically mounted to a motor 96 for rotation. The mandrel 94 receives a spool 98 having flanges 100. The mandrel 94 receives and holds an end of the flexible core 12 for wrapping the core on the mandrel.

FIG. 6 is a cross-section illustration of a pump 120 having a plurality of seals 30 constructed in accordance with the present invention. The pump 120 provides a stuffing box 124 and defines three openings 126, 128 and 130. The openings 126 and 128 are fluid flow ports provided for the intake and expulsion of fluid, respectively. The opening 126 identifies the location at which fluid enters the pump 120 and the opening 128 identifies the location at which fluid is expelled from the pump. The opening 130 is provided for a shaft 132. The shaft 132 connects to a motor (not shown) at one end and to an impeller (not shown) at the other end. The motor end of the shaft 132 is indicated by the arrow 134. The impeller end of the shaft 132 is indicated by the arrow identified at 136. Toward the impeller end 136, the shaft 132 is encompassed by a bushing 138. Toward the motor end 134, the shaft 120 is encompassed by a gland follower 140. The gland follower 140 includes a flange 141 that inserts into the stuffing box 124 to apply pressure against the packing rings 30. Those skilled in the art will appreciate that the gland follower 140 is torqued down on threaded bolts 144 with nuts 146. In the illustrated embodiment, a liveload assembly 150 sits between the nut 146 and the gland follower 140 to apply force to the gland follower and against the packing rings 130 in the stuffing box 124.

With reference to FIG. 4, the packing material 10 of the present invention is manufactured using the apparatus 50. The spool 52 holds a supply of the core 12. A leading end of the flexible core 12 feeds through the apparatus 50 and attaches to the take-up spool 98. The leading edge of the core passes through the hopper 56, through the openings 72 between the plurality of calendar rollers 60 and 62, and around the wheel 81. The hopper 56 is filled with a plurality of particles 22. In a preferred embodiment, the particles are expanded intercalated flake graphite. Expandable intercalated flake graphite is formed by treating natural or synthetic flake graphite with an intercolating agent such as fuming nitric acid, fuming sulphuric acid, or mixtures of concentrated nitric and sulphuric acid. Expandable intercalated flake graphite can then be expanded to form a low density, worm-like form of particulate graphite. The production of expandable intercalated flake graphite as an intermediate step in the production of expanded intercalated flake graphite is described in U.S. Pat. No. 3,404,061.

The motor 96 is started to begin slowly winding the core 12 onto the spool 98. The variable speed drive motor (not illustrated) connected to the shafts 66 for the rollers 60 and 62 is also started. The drive motor operates each of the rollers at the same speed.

The sprayer 54 applies a thin film of adhesive to the outer surface of the core 12 as it passes through the sprayer. In a preferred embodiment, the adhesive is a polyvenideline (PVDC), such as Resin 701 supplied by Rohm & Haase Corporation. Such an adhesive provides several advantages including chemically inert, high temperature range, and flame retardant. The adhesive is preferably about 7 percent by weight, but can range as low as about 2 percent. The particles 22 attach to the adhesive as the core 12 passes through the hopper 56. The length of core 12 exits the hopper 56 and passes through the plurality of calendar rollers 60 and 62.

As illustrated in FIG. 5, the core 12 passes through the openings 72 between the V-groove rollers 60 and 62. In a preferred embodiment, the openings 72 decrease in cross-sectional size in sequence as the core 12 moves from the calendar rollers 60a, 62a to the calendar rollers 60b, 62b and then to the calendar rollers 60c and 62c. The tube members 76 and 78 between the adjacent pairs of calendar rollers 60 and 62 guide the flexible core 12 as it travels between the rollers. The tubes 76 and 78 also retain particles 22 that fall from the hopper 56 into the calendar rollers 60 and 62. The tube members 76 and 78 accordingly keep the core 12 exposed to particles 22. The particles 22 are initially attached to the core 12 by the adhesive. The core 12 passes through the calendaring rollers 60 and 62 pulled through by the rotation and by gravity. The particles 22 attach to each other to form the seamless skin 20 around the core 12. The decreasing cross-sectional width of the openings 72 initiates compressing the particles together.

The length of packing 12 passes through the compressor 79. The core 12 with the attached particles 22 moves over the wheel 81 between the walls 86. The walls 86 are spaced apart a predetermined distance equal to the cross-sectional width for the packing material 10 that is being manufactured. The roller 88 bears against the core 12 as it passes on the sector of the wheel 81. The core 12 that passes through the compressor 79 is compressed by the roller 88 that bears on the core against the wheel 81. As a result of the turning of the wheel 81, the packing material 10 is imparted with a twist bias to facilitate forming a spiral coil. Also, the roller 88 compresses the particles 22 to form the seamless skin 20. The compressed packing material 10 is wound onto a spool 98. The motor 96 rotates the mandrel 94 that carries the spool 98.

Those skilled in the art will appreciate that the packing material 10 of the present invention may be manufactured at less cost and with increased uniformity than prior art packing materials. Moreover, the present invention produces a packing material having a unitary, seamless layer of expanded graphite about the outer surface of the core 12. The present invention reduces the need for use of adhesive, and retains the benefits of both soft packings and metallic and graphite packings. Alternate embodiments of the packing material 10 may be readily produced. For example, the core 12 may be formed with trapezoidal cross-section, or, the core may be formed with faces presented concavely or convexly curved. Such considerations are dictated by the ultimate use of the packing material.

The spool 98 carrying the packing material 10 is then available for preparing packing rings 30 illustrated in FIG. 3 for use in the fluid flow control equipment. For example, with reference to FIG. 6, a length of the packing material 10 is cut to length and encircled to form the packing ring 30 illustrated in FIG. 3. A plurality of the packing rings 30 are placed into the stuffing box 124 of a fluid flow control device, such as the pump 120 illustrated in FIG. 5. When the stuffing box 124 is full, the gland follower 140 is positioned with the flange 142 closing the stuffing box 124. The gland follower 140 is conventionally secured, such as by bolts 144 and nuts 146. In the illustrated embodiment, a liveload assembly 150 is positioned between the nut 146 and the gland follower 140 to apply force to the gland follower and thus against the packing rings 130 and the stuffing box 124. In a preferred of the present invention, the core 12 is made of a wire mesh. The metallic core thus acts like a spring in opening and closing to provide the proper ring size. The expanded graphite skin 20 allows for such opening and closing, but assures a seal of uniform density and consistent seamless covering for the packing ring 30.

In an alternate embodiment, the core 12 exiting the calendaring rollers 60 and 62 is cut to length to fit a particular stuffing box. The length of packing 10 is placed in a conventional die and compressed to the desired cross-section and diameter for the particular stuffing box. Thus, the packing material 10 of the present invention can be supplied in its preferred form as a spiral coil for use in repacking stuffing boxes, or can be provided as a preformed die cut-ring for installation in a stuffing box of a fluid flow equipment.

Packing embodying the present invention was tested in valves under stress conditions to compare its performance with other known packings. In designing tests for comparing packing, it is recognized that the operation of valves, and other fluid flow devices, vary in processing plants. Some valves open more frequently than others. Typically, control valves operate most frequently. In some cases the control valves operate as often as every minute, or less. Other valves may operate only infrequently, for example once per month or year. Also, the speed and travel length of the stem vary. The speed and travel length depend particularly on the manufacture of the valve, the size of the valve, and the function performed by the valve.

The test valves were manufactured by Velan with the following specifications:

| Type - Gate Valve | Size 6 inch |
|---|---|
| Class: 300 WOG | |
| Stem Diameter: 1-¼ inch | Box Diameter: 1-⅞ inch |
| Stem Finish: 32 RMS | Box Finish: 63 RMS |

An actuator operated the valve. The stroke length of the valve was 14 inches and the stem moved at the rate of 14 inches per minute. The valve was pressured to 100 pounds per square inch (psi) with methane gas.

The test apparatus includes the capability to monitor friction on the stem imposed by the packing and the torque on the gland follower. A load cell mounts between the valve stem and the actuator. The load cell measures the force required to open and to close the valve. The force indicates the friction imposed by the packing on the stem. The actuators and the load cells have a 5000 pound capacity. One cycle is defined as one closing and one opening stroke. A digital electronic counter maintains the cycle count for each valve.

The packings included in the tests were installed pursuant to the recommended procedures by the particular manufacturer of the packing. The initial torque on the packing used to seal the valve was sufficient to reach zero leakage or as close to zero leakage as possible. The valves were retorqued when the leakage exceeded 500 parts per million. Leakage was determined by the use of an organic chemical sniffer which meets the requirements of Title 40 of the Code of Federal Regulations, Appendix A, Method 21.

The tests used a Bacharach sniffer model 23-7350 to detect emissions of methane gas from the valve. The sniffer is manufactured by Bacharach Instrument Company of Pittsburgh, Pa. and is approved by the United States Environmental Protection Agency for detection of methane. The tests use methane gas because this gas leaks easier than other fluids, except helium and hydrogen gases.

The packing of the present invention was tested for comparison with three other packings. The torque (in inch-pounds) is the force applied to the packing by the gland follower pursuant to the specifications of the manufacturer of the packing.

| Packing | Torque (in.-lbs.) | Description |
| --- | --- | --- |
| 1. OEM | 500 | Flexible graphite rings with carbon end rings |
| 2. Graphite | 200 | Flexible core with graphite sheet longitudinally-wrapped skin |
| 3. Carbon/Graphite | 500 | Carbon yarn jacket covering braided flexible graphite yarn core |
| 4. Seamless intercolated graphite skin | 300 | Embodiment of the present invention (fiberglass core) |

As discussed above, the test valves were monitored for emissions and for the force required to operate the valve. The valves were checked randomly while cycling and leakage measurements recorded. If leakage emissions exceeded 500 parts per million (ppm), the valve was retorqued to the specification shown above. Both opening and closing friction were measured during the tests and averaged together. Table 2 shown below reports leakage (L) and average friction (F) measurements made during random cycles (C) for each sealing material. The leakage is reported in parts per million; the friction is reported in pounds.

TABLE 2

| Packing 1 | | | Packing 2 | | | Packing 3 | | | Packing 4 | | |
| --- | --- | --- | --- | --- | --- | --- | --- | --- | --- | --- | --- |
| C | L | T | C | L | T | C | L | T | C | L | T |
| 43 | 25 | 1153 | 95 | 0 | 170 | 158 | 820 | 540 | 101 | 8 | 392 |
| 479 | 200 | 1050 | 475 | 0 | 442 | 878 | 80 | 1078 | 795 | 20 | 440 |
| 1560 | 550 | 1000 | 1540 | 105 | 486 | 1397 | 1500 | 445 | 1393 | 0 | 325 |
| 2119 | 290 | 1132 | 2142 | 90 | 500 | 2061 | 2200 | 338 | 2067 | 0 | 260 |
| 2324 | 450 | 1110 | 2327 | 380 | 398 | 2179 | 600 | 503 | 2216 | 0 | 270 |
| 2568 | 1500 | 1075 | 2505 | 62 | 625 | DISCONTINUED | | | 2517 | 0 | 265 |

Packing 1 was retorqued twice during the tests; packing 2 was retorqued three times; packing 3, seven times; packing 4, one retorque. The packing 4 of the present invention showed improved performance over the other packings.

The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without departing from the spirit of the invention as described by the following claims.

What is claimed is:

1. A method of making a seamless packing material for use in forming a seal, comprising:

surrounding a flexible elongate core with a plurality of particles;

feeding the core and the particles through an opening defined by at least one pair of adjacent V-groove rollers;

wrapping the core under tension around an arc of a cylinder between a pair of spaced-apart radial walls extending outwardly from the cylinder; and pushing a roller against the core on the arc, whereby the packing material, being pressed by the wheel in the arcuate section, is compressed.

2. The method as recited in claim 1, further comprising the initial step of applying a film of an adhesive to an exterior surface of the core.

3. The method as recited in claim 1, further comprising the step of wrapping the compressed core on a spool to form a coil of packing material.

4. The method as recited in claim 1, wherein the core and the particles feed through an opening in a plurality of pairs of rollers, each pair having sequentially decreased sized openings along a feed direction of the core and particles.

5. A method of making a seamless packing material for use in forming a seal, comprising:

surrounding a flexible elongate core with a plurality of expanded intercalated graphite worms;

feeding the core and the expanded intercalated graphite worms through an opening defined by at least one pair of adjacent V-groove rollers;

wrapping the core under tension around an arcuate section of a cylinder between a pair of spaced-apart radial walls extending outwardly from the cylinder; and pushing a roller against the core in the arcuate section, whereby the packing material, being pressed by the wheel, is compressed.

6. The method as recited in claim 5, further comprising an initial step of applying a film of an adhesive to an exterior surface of the core.

7. The method as recited in claim 5, further comprising the step of wrapping the compressed core on a spool to form a coil of packing material.

8. The method as recited in claim 5, wherein the core and the expanded intercalated graphite worms feed through an opening in a plurality of pairs of roller, each pair having sequentially decreasing sized openings along a feed direction of the core.

* * * * *